(12) United States Patent
Akiyama

(10) Patent No.: US 11,493,840 B2
(45) Date of Patent: Nov. 8, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 17/102,880

(22) Filed: Nov. 24, 2020

(65) Prior Publication Data

US 2021/0157222 A1  May 27, 2021

(30) Foreign Application Priority Data

Nov. 25, 2019 (JP) .............................. JP2019-212093

(51) Int. Cl.
  *G03B 21/20* (2006.01)
  *G02B 5/04* (2006.01)
(52) U.S. Cl.
  CPC ............ *G03B 21/2066* (2013.01); *G02B 5/04* (2013.01); *G03B 21/204* (2013.01); *G03B 21/208* (2013.01)
(58) Field of Classification Search
  None
  See application file for complete search history.

(56) References Cited

U.S. PATENT DOCUMENTS

2011/0234998 A1    9/2011   Kurosaki

FOREIGN PATENT DOCUMENTS

| EP | 1571481 A1 | * | 9/2005 | ........... G02B 27/126 |
|---|---|---|---|---|
| JP | 2011-197597 A | | 10/2011 | |
| JP | 2015-121606 A | | 7/2015 | |
| JP | 2015121606 A | * | 7/2015 | |

* cited by examiner

*Primary Examiner* — Michelle M Iacoletti
*Assistant Examiner* — Danell L Owens
(74) *Attorney, Agent, or Firm* — Dority & Manning, P.A.

(57) ABSTRACT

A light source device according to the present disclosure includes a light source section for emitting a first pencil and a second pencil, a first optical element for altering a proceeding direction of a principal ray of the first pencil, a second optical element for altering a proceeding direction of a principal ray of the second pencil, a wavelength conversion layer having a plane of incidence, a reflecting surface, a first side surface, and a second side surface, a first reflecting element having a first reflecting surface, and a second reflecting element having a second reflecting surface.

9 Claims, 10 Drawing Sheets ness emitting area on an upper surface of the phosphor layer, an area including the fluorescence emitting area and an area outside the fluorescence emitting area in a plan view is irradiated with the excitation light, and the excitation light enters the phosphor layer from the side surface.

LIGHT SOURCE DEVICE AND PROJECTOR

The present application is based on, and claims priority from JP Application Serial Number 2019-212093, filed Nov. 25, 2019, the disclosure of which is hereby incorporated by reference herein in its entirety.

BACKGROUND

1. Technical Field

The present disclosure relates to a light source device and a projector.

2. Related Art

In the projector field, there is proposed a light source device using fluorescence emitted from a phosphor when irradiating the phosphor with excitation light emitted from a light source. In JP-A-2015-121606 (Document 1), there is disclosed a light source device provided with a phosphor layer, a dichroic mirror disposed on a side surface of the phosphor layer, a reflecting section disposed on a bottom surface of the phosphor layer, and an excitation light source. In this light source device, the fluorescence is emitted from a fluorescence emitting area on an upper surface of the phosphor layer, an area including the fluorescence emitting area and an area outside the fluorescence emitting area in a plan view is irradiated with the excitation light, and the excitation light enters the phosphor layer from the side surface.

In Document 1, the area of an excitation light irradiation area is made larger than the area of the fluorescence emitting area while keeping the shape of the excitation light irradiation area similar to the shape of the fluorescence emitting area. However, depending on the arrangement of reflecting members in the periphery of the phosphor layer, apart of the excitation light fails to be used for the wavelength conversion to decrease the use efficiency of the excitation light in some cases.

SUMMARY

In order to solve the problem described above, a light source device according to an aspect of the present disclosure includes a light source configured to emit a first pencil and a second pencil which have a first wavelength band, a first optical element configured to alter a proceeding direction of a principal ray of the first pencil, a second optical element configured to alter a proceeding direction of a principal ray of the second pencil, a wavelength conversion layer having a plane of incidence which the first pencil and the second pencil enter, a reflecting surface different from the plane of incidence, a first side surface crossing the plane of incidence and the reflecting surface, and a second side surface which crosses the plane of incidence and the reflecting surface and is different from the first side surface, and configured to perform wavelength conversion of the first pencil and the second pencil into fluorescence having a second wavelength band different from the first wavelength band, a first reflecting element having a first reflecting surface and disposed so as to be opposed to the first side surface, and a second reflecting element having a second reflecting surface and disposed so as to be opposed to the second side surface. The first optical element and the second optical element alter the proceeding directions of the principal ray of the first pencil and the principal ray of the second pencil so that the principal ray of the first pencil and the principal ray of the second pencil fail to overlap each other on the plane of incidence. When viewed from an incident direction of the first pencil and the second pencil with respect to the wavelength conversion layer, a shape of the plane of incidence is a rectangular shape, and the first pencil and the second pencil fail to enter an area other than the plane of incidence, the first reflecting surface, and the second reflecting surface, the first pencil is reflected by the first reflecting element to enter the wavelength conversion layer from the first side surface, and the second pencil is reflected by the second reflecting element to enter the wavelength conversion layer from the second side surface.

The light source device according to the aspect of the present disclosure may be configured such that the light source device further include a third optical element, a fourth optical element, a third reflecting element having a third reflecting surface, and a fourth reflecting element having a fourth reflecting surface, wherein the light source further emits a third pencil and a fourth pencil which have the first wavelength band, the third optical element alters a proceeding direction of a principal ray of the third pencil, the fourth optical element alters a proceeding direction of a principal ray of the fourth pencil, the wavelength conversion layer further has a third side surface crossing the plane of incidence, the reflecting surface, and the first side surface, and a fourth side surface which crosses the plane of incidence, the reflecting surface, and the first side surface, and is different from the third side surface, the third reflecting element is disposed so as to be opposed to the third side surface, the fourth reflecting element is disposed so as to be opposed to the fourth side surface, the third optical element alters the proceeding direction of the principal ray of the third pencil so that the principal ray of the third pencil fails to overlap the principal ray of the first pencil, the principal ray of the second pencil, and the principal ray of the fourth pencil on the plane of incidence, the fourth optical element alters the proceeding direction of the principal ray of the fourth pencil so that the principal ray of the fourth pencil fails to overlap the principal ray of the first pencil, the principal ray of the second pencil, and the principal ray of the third pencil on the plane of incidence, the first pencil, the second pencil, the third pencil, and the fourth pencil fail to enter an area other than the plane of incidence, the first reflecting surface, the second reflecting surface, the third reflecting surface, and the fourth reflecting surface when viewed from the incident direction, the third pencil is reflected by the third reflecting element to enter the wavelength conversion layer from the third side surface, and the fourth pencil is reflected by the fourth reflecting element to enter the wavelength conversion layer from the fourth side surface.

In the light source device according to the aspect of the present disclosure, the first optical element and the second optical element may be deviation prisms.

The light source device according to the aspect of the present disclosure may further include a third optical element which is disposed on light paths of the first pencil and the second pencil between the light source and the deviation prisms, and homogenizes illuminance of the first pencil and the second pencil.

In the light source device according to the aspect of the present disclosure, the first optical element and the second optical element may be multi-lens arrays, and an optical axis of the multi-lens array may be tilted with respect to one of the principal ray of the first pencil and the principal ray of the second pencil which is going to enter the multi-lens array.

A projector according to another aspect of the present disclosure includes the light source device according to the aspect of the present disclosure, a light modulation device configured to modulate light emitted from the light source device in accordance with image information, and a projection optical device configured to project the light modulated by the light modulation device.

DESCRIPTION OF EXEMPLARY EMBODIMENTS

First Embodiment

Figure 1:
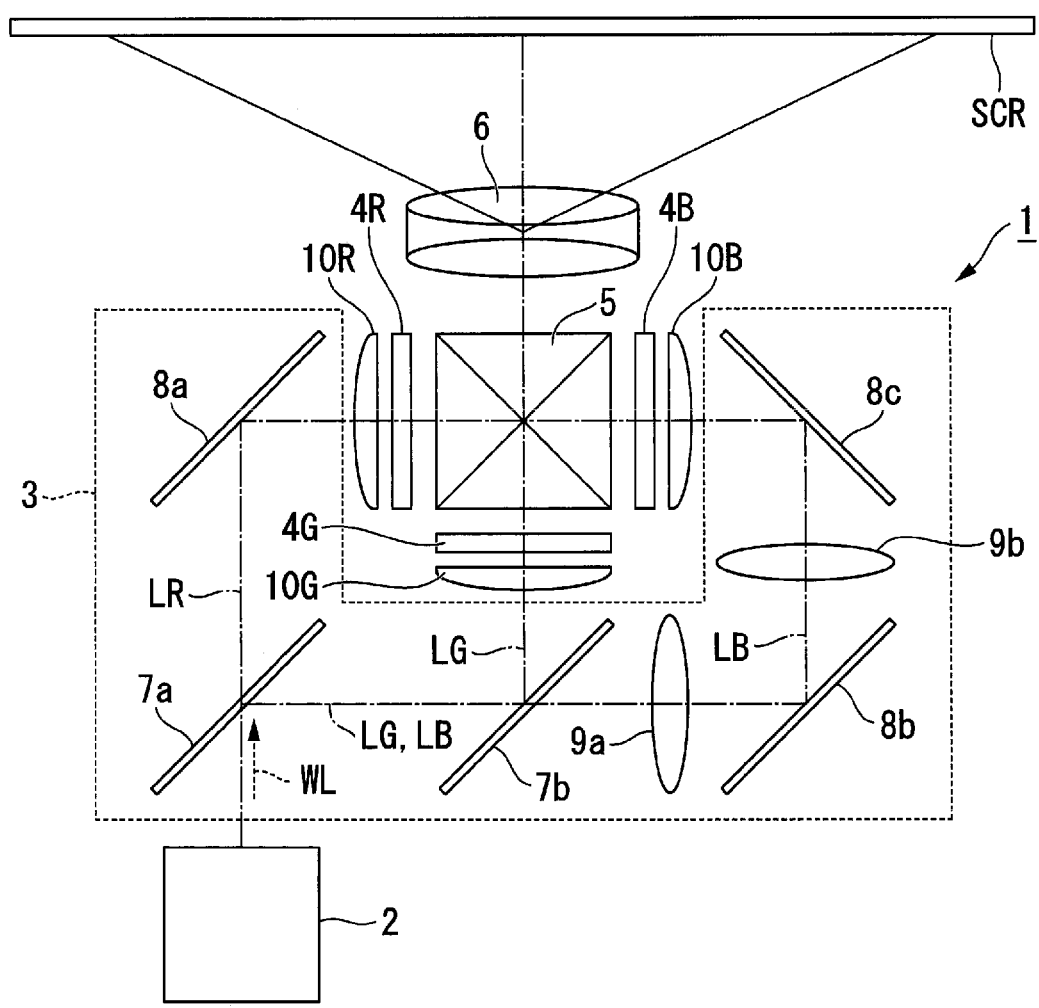
FIG. 1 is a schematic configuration diagram of a projector according to a first embodiment.

A first embodiment of the present disclosure will hereinafter be described using FIG. 1 through FIG. 7.

In the drawings described below, the constituents are shown with the respective scale ratios of the sizes different from each other in some cases in order to make the constituents eye-friendly.

An example of a projector according to the present embodiment will be described.

FIG. 1 is a diagram showing a schematic configuration of the projector according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. The configuration of the illumination device 2 will be described later.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light WL emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR having been transmitted through the first dichroic mirror 7a is reflected by the reflecting mirror 8a, and is then transmitted through the field lens 10R to enter an image forming area of the light modulation device 4R for the red light. The green light LG having been reflected by the first dichroic mirror 7a is further reflected by the second dichroic mirror 7b, and then transmitted through the field lens 10G to enter an image forming area of the light modulation device 4G for the green light. The blue light LB having been transmitted through the second dichroic mirror 7b enters an image forming area of the light modulation device 4B for the blue light via the relay lens 9a, the reflecting mirror 8b on the incident side, the relay lens 9b, the reflecting mirror 8c on the exit side, and the field lens 10B.

The light modulation device 4R, the light modulation device 4G, and the light modulation device 4B each modulate the colored light as the incident light in accordance with image information to thereby form image light. The light modulation device 4R, the light modulation device 4G, and the light modulation device 4B are each formed of a liquid crystal light valve. Although not shown in the drawings, on the light incident side of each of the light modulation device 4R, the light modulation device 4G, and the light modulation device 4B, there is disposed an incident side polarization plate. On the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism having four rectangular prisms bonded to each other to have a substantially square shape in the plan view. On the interfaces having a substantially X shape on which the rectangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the light modulated by the light modulation device 4R, the light modulated by the light modulation device 4G, and the light modulated by the light modulation device 4B. The projection optical device 6 is constituted by a plurality of projection lenses.

An example of the illumination device 2 in the present embodiment will be described.

Figure 2:
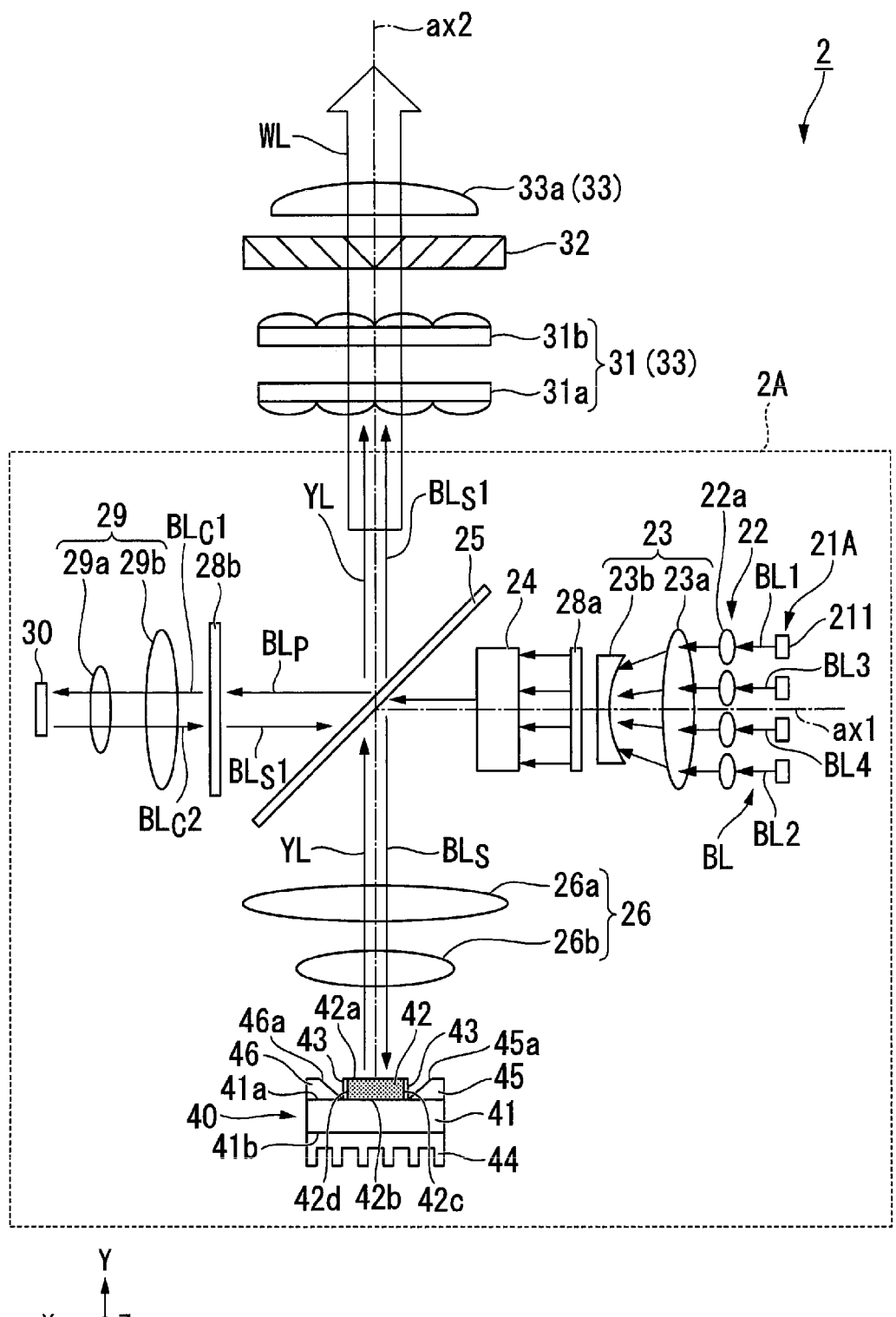
FIG. 2 is a schematic configuration diagram of a light source device.

FIG. 2 is a diagram showing a schematic configuration of the illumination device 2.

As shown in FIG. 2, the illumination device 2 is provided with a light source device 2A, an integrator optical system 31, a polarization conversion element 32, and a superimposing lens 33a. The integrator optical system 31 and the superimposing lens 33a constitute a superimposing optical system 33.

The light source device 2A is provided with a light source section 21A, a collimator optical system 22, an afocal optical system 23, a first wave plate 28a, a light path alteration section 24, a polarization split element 25, a first light collection optical system 26, a wavelength conversion element 40, a second wave plate 28b, a second light collection optical system 29, and a diffusely reflecting element 30.

Hereinafter, a direction in which a light beam BL is emitted from the light source section 21A is defined as an X-axis direction, a direction in which fluorescence YL is emitted from the wavelength conversion element 40 is defined as a Y-axis direction, and a direction perpendicular to the X-axis direction and the Y-axis direction is defined as a Z-axis direction.

The light source section 21A, the collimator optical system 22, the afocal optical system 23, the first wave plate 28a, the light path alteration section 24, the polarization split element 25, the second wave plate 28b, the second light collection optical system 29, and the diffusely reflecting element 30 are arranged in series on a light axis ax1. The wavelength conversion element 40, the first light collection optical system 26, the polarization split element 25, the integrator optical system 31, the polarization conversion element 32, and the superimposing lens 33a are arranged in series on a light axis ax2. The light axis ax1 and the light axis ax2 are located in the same plane, and are perpendicular to each other.

The light source section 21A is provided with a plurality of light emitting elements 211 for emitting the excitation light beams. The plurality of light emitting elements 211 is arranged in an array in a plane perpendicular to the light axis ax1. In the case of the present embodiment, the light source section 21A has a configuration in which four sets of light source units each having the four light emitting elements 211 arranged in a line are arranged in a direction perpendicular to the arrangement direction of the four light emitting elements 211. In other words, the light source section 21A has a configuration having the sixteen light emitting elements 211 in a 4×4 array. It should be noted that the number and the arrangement of the light emitting elements 211 are not limited to the configuration described above.

Figure 3:
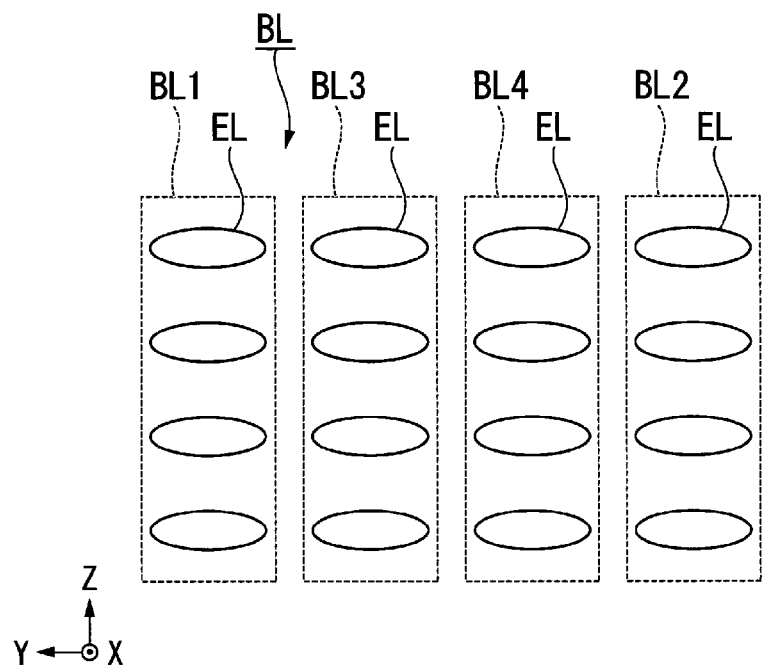
FIG. 3 is a front view showing an arrangement of excitation light beams emitted from a light source section.

FIG. 3 is a front view of the arrangement of the excitation light beams EL emitted from the light source section 21A viewed from the emission direction of the excitation light beams EL.

As shown in FIG. 3, the sixteen excitation light beams EL emitted from the sixteen light emitting elements 211 are arranged in a 4×4 array. Here, the four excitation light beams EL arranged in the vertical direction shown in FIG. 3 are collectively referred to as a pencil. Hereinafter, for the sake of convenience of explanation, in FIG. 3, the pencil at the left end is referred to as a first pencil BL1, the pencil at the right end is referred to as a second pencil BL2, the second pencil from the left is referred to as a third pencil BL3, and the second pencil from the right is referred to as a fourth pencil BL4.

The light emitting element 211 is formed of a semiconductor laser element. The semiconductor laser element emits a blue light beam in a first wavelength band, specifically, a laser beam in a first wavelength band with a peak wavelength of, for example, 460 nm. Therefore, the light source section 21A emits the pencils BL including the first pencil BL1, the second pencil BL2, the third pencil BL3, and the fourth pencil BL4 as a whole.

As shown in FIG. 3, the pencils BL emitted from the light source section 21A enter the collimator optical system 22. The collimator optical system 22 converts the pencils BL emitted from the light source section 21A into parallel light. The collimator optical system. 22 is constituted by a plurality of collimator lenses 22a arranged side by side in an array. The collimator lenses 22a are disposed so as to correspond one-to-one to the light emitting elements 211.

The pencils BL having been transmitted through the collimator optical system 22 enter the afocal optical system 23. The afocal optical system 23 adjusts the diameter of the pencils BL, namely the thickness of the pencils BL. The afocal optical system 23 is constituted by a convex lens 23a and a concave lens 23b.

The pencils BL having passed through the afocal optical system 23 enter the first wave plate 28a. The first wave plate 28a is formed of, for example, a ½ wave plate which is made rotatable. The pencils BL emitted from the light emitting elements 211 are each linearly polarized light having a predetermined polarization direction. By appropriately setting the rotational angle of the first wave plate 28a, the pencils BL including an S-polarization component and a P-polarization component with respect to the polarization split element 25 at a predetermined ratio can be obtained as the pencils BL transmitted through the first wave plate 28a. By changing the rotational angle of the first wave plate 28a, it is possible to change the ratio between the S-polarization component and the P-polarization component.

The pencils BL having passed through the first wave plate 28a enter the light path alteration section 24. The light path alteration section 24 changes the proceeding direction of the principal lay of each of the first pencil BL1, the second pencil BL2, the third pencil BL3, and the fourth pencil BL4. The configuration of the light path alteration section 24 will be described later in detail.

The pencils BL emitted from the light path alteration section 24 and including the S-polarization component and the P-polarization component enter the polarization split element 25. The polarization split element 25 is formed of, for example, a polarization beam splitter having wavelength selectivity. The polarization split element 25 is arranged so as to form an angle of 45° with respect to each of the light axis ax1 and the light axis ax2.

The polarization split element 25 has a polarization split function of splitting each of the pencils BL into a pencil BLs as the S-polarization component with respect to the polarization split element 25 and a pencil BLp as the P-polarization component. Specifically, the polarization split element 25 reflects the pencil BLs as the S-polarization component, and transmits the pencil BLp as the P-polarization component. Further, the polarization split element 25 has a color separation function of transmitting a yellow light component different in wavelength band from the pencil BL as blue light irrespective of the polarization state of the yellow light component in addition to the polarization split function.

The pencil BLs as the S-polarized light having been emitted from the polarization split element 25 enters the first light collection optical system 26. The first light collection optical system 26 converges the pencil BLs toward the wavelength conversion element 40. The first light collection optical system 26 is constituted by a first lens 26a and a second lens 26b. The first lens 26a and the second lens 26b are each formed of a convex lens. The pencil BLs having been emitted from the first light collection optical system 26 enters the wavelength conversion element 40 in a converged state.

Figure 4:
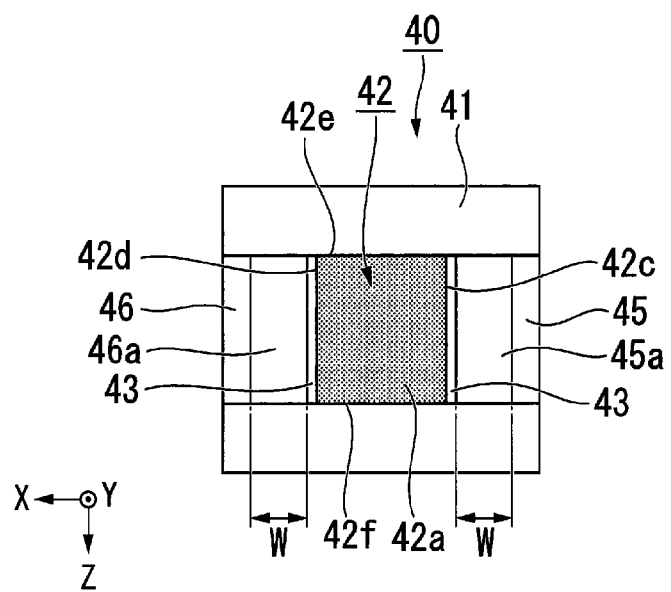
FIG. 4 is a plan view of a wavelength conversion element.

FIG. 4 is a plan view of the wavelength conversion element 40 viewed from an incident direction of the pencil BLs. In the following description, the view of the wavelength conversion element from the incident direction of the pencil BLs is referred to as a plan view.

As shown in FIG. 2 and FIG. 4, the wavelength conversion element 40 is provided with a base member 41, a wavelength conversion layer 42, a first reflecting element 45, a second reflecting element 46, a dichroic mirror 43, and a heatsink 44. In the present embodiment, the wavelength conversion layer 42 is formed of a phosphor. In the present embodiment, as the wavelength conversion element 40, there is used a stationary wavelength conversion element which does not have a drive source such as a motor, and is not made rotatable.

The wavelength conversion layer 42 includes a ceramic phosphor for converting the pencil BLs into the fluorescence YL in a second wavelength band different from the first wavelength band. The second wavelength band is in a range of, for example, 490 through 750 nm, and the fluorescence YL is yellow light including the green light component and the red light component. It should be noted that it is also possible for the wavelength conversion layer 42 to include a single-crystal phosphor.

The wavelength conversion layer 42 has a plane of incidence 42a, a reflecting surface 42b, a first side surface 42c, a second side surface 42d, a third side surface 42e, and a fourth sides surface 42f. The plane of incidence 42a is a surface which the first pencil BL1, the second pencil BL2, the third pencil BL3, and the fourth pencil BL4 enter. The reflecting surface 42b is a surface opposed to the base member 41 unlike the plane of incidence 42a. The first side surface 42c is a surface crossing the plane of incidence 42a and the reflecting surface 42b. The second side surface 42d is a surface which crosses the plane of incidence 42a and the reflecting surface 42b, and is different from the first side surface 42c. The third side surface 42e is a surface crossing the plane of incidence 42a, the reflecting surface 42b, and the first side surface 42c. The fourth side surface 42f is a surface which crosses the plane of incidence 42a, the reflecting surface 42b, and the first side surface 42c, and is different from the third side surface 42e. The second side surface 42d is a surface opposed to the first side surface 42c. The fourth side surface 42f is a surface opposed to the third side surface 42e. The third side surface 42e and the fourth side surface 42f cross the second side surface 42d.

The wavelength conversion layer 42 includes, for example, an yttrium aluminum garnet (YAG) type phosphor. Citing YAG:Ce including cerium (Ce) as an activator agent as an example, as the wavelength conversion layer 42, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process.

The wavelength conversion layer 42 is bonded to a first surface 41a of the base member 41 with a bonding material (not shown). As the bonding material, there is used, for example, a nano-silver sintered metal material. The base member 41 is formed of a metal material high in optical reflectance such as aluminum or silver. The first surface 41a of the base member 41 reflects the light proceeding inside the wavelength conversion layer 42. Further, it is possible to further provide a reflecting layer to the first surface 41a of the base member 41.

The first reflecting element 45 and the second reflecting element 46 are disposed on the first surface 41a of the base member 41. The first reflecting element 45 has a first reflecting surface 45a, and is disposed so that the first reflecting surface 45a is opposed to the first side surface 42c of the wavelength conversion layer 42. The first reflecting surface 45a is tilted so as to form an angle of 45° with respect to the first surface 41a of the base member 41. The second reflecting element 46 has a second reflecting surface 46a, and is disposed so that the second reflecting surface 46a is opposed to the second side surface 42d of the wavelength conversion layer 42. The second reflecting surface 46a is tilted so as to form an angle of 45° with respect to the first surface 41a of the base member 41. The first reflecting element 45 and the second reflecting element 46 are each formed of a metal material high in optical reflectance such as aluminum or silver. The height of the first reflecting element 45 and the second reflecting element 46 is equal to the thickness of the wavelength conversion layer 42.

In the case of the present embodiment, since the wavelength conversion element 40 has the first reflecting element 45, the first pencil BL1 having been emitted toward the first reflecting element 45 is reflected by the first reflecting surface 45a, and then enters the wavelength conversion layer 42 from the first side surface 42c via the dichroic mirror 43. Further, since the wavelength conversion element 40 has the second reflecting element 46, the second pencil BL2 having been emitted toward the second reflecting element 46 is reflected by the second reflecting surface 46a, and then enters the wavelength conversion layer 42 from the second side surface 42d via the dichroic mirror 43. As described above, the pencils BL with which the wavelength conversion element 40 is irradiated enters the wavelength conversion layer 42 not only from the plane of incidence 42a but also from the first side surface 42c and the second side surface 42d.

On the first side surface 42c of the wavelength conversion layer 42, there is disposed the dichroic mirror 43 so as to be opposed to the first reflecting element 45. Similarly, on the second side surface 42d of the wavelength conversion layer 42, there is disposed the dichroic mirror 43 so as to be opposed to the second reflecting element 46. The dichroic mirror 43 transmits the blue light component, and reflects the yellow light component. In other words, the dichroic mirror 43 transmits the pencil BLs in the first wavelength band, and reflects the fluorescence YL in the second wavelength band. It should be noted that a reflecting layer for reflecting the fluorescence YL can be disposed on the third side surface 42e and the fourth side surface 42f of the wavelength conversion layer 42.

The heatsink 44 has a plurality of fins. The heatsink 44 is disposed on a second surface 41b of the base member 41. The heatsink 44 is fixed to the base member 41 with, for example, metal bonding. In the wavelength conversion element 40, since the heat of the wavelength conversion layer 42 can be released via the heatsink 44, the heat deterioration of the wavelength conversion layer 42 can be prevented.

As shown in FIG. 4, in the plan view, the wavelength conversion element 40 has the wavelength conversion layer 42 having a substantially square shape. As described above, since the first reflecting surface 45a and the second reflecting surface 46a have an angle of 45° with respect to the first surface 41a of the base member 41, the width W of the first reflecting surface 45a and the second reflecting surface 46a in the plan view is equal to the thickness of the wavelength conversion layer 42, and is in a range of, for example, about 50 through 100 μm.

As shown in FIG. 2, the fluorescence YL as yellow light having been generated in the wavelength conversion element 40 is collimated by the first light collection optical system 26, and then enters the polarization split element 25. As described above, since the polarization split element 25 has a property of transmitting the yellow light component irrespective of the polarization state, the fluorescence YL is transmitted through the polarization split element 25.

Meanwhile, the pencil BLp as the P-polarized light having been emitted from the polarization split element 25 enters the second wave plate 28b. The second wave plate 28b is formed of a ¼ wave plate disposed in the light path between the polarization split element 25 and the diffusely reflecting element 30. Therefore, the pencil BLp as the P-polarized light having been emitted from the polarization split element 25 is converted by the second wave plate 28b into, for example, a blue pencil BLc1 as clockwise circularly polarized light, and then enters the second light collection optical system 29.

The second light collection optical system 29 is constituted by a first lens 29a and a second lens 29b. The first lens 29a and the second lens 29b are each formed of a convex lens. The second light collection optical system 29 makes the blue pencil BLc1 enter the diffusely reflecting element 30 in a converged state.

The diffusely reflecting element 30 is disposed on the light path of the pencil BLp emitted from the polarization split element 25. The diffusely reflecting element 30 diffusely reflects the blue pencil BLc1, which has been emitted from the second light collection optical system 29, toward the polarization split element 25. It is desirable for the diffusely reflecting element 30 to perform the Lambertian reflection on the blue pencil BLc1, and at the same time, not to disturb the polarization state of the blue pencil BLc1.

The light diffusely reflected by the diffusely reflecting element 30 is hereinafter referred to as a blue pencil BLc2. In the present embodiment, by diffusely reflecting the blue pencil BLc1, there can be obtained the blue pencil BLc2 having a substantially homogenous illuminance distribution. For example, the blue pencil BLc1 as the clockwise circularly polarized light is diffusely reflected by the diffusely reflecting element 30 to thereby be converted into the blue pencil BLc2 as the counterclockwise circularly polarized light.

The blue pencil BLc2 is converted by the second light collection optical system 29 into a parallel pencil, and then enters the second wave plate 28b once again. The blue pencil BLc2 as the counterclockwise circularly polarized light is converted by the second wave plate 28b into a blue pencil BLs1 as S-polarized light. The blue pencil BLs1 as the S-polarized light is reflected by the polarization split element 25 toward the integrator optical system 31.

Thus, the blue pencil BLs1 is combined with the fluorescence YL having been transmitted through the polarization split element 25, and is used as the illumination light WL. Specifically, the blue pencil BLs1 and the fluorescence YL are emitted from the polarization split element 25 toward the respective directions the same as each other, and thus, there is generated the illumination light WL as the white light having the blue pencil BLs1 and the fluorescence YL as the yellow light combined with each other.

The illumination light WL is emitted toward the integrator optical system 31. The integrator optical system 31 is constituted by a first lens array 31a and a second lens array 31b. The first lens array 31a and the second lens array 31b each have a configuration having a plurality of lenses arranged in an array.

The illumination light WL having been transmitted through the integrator optical system 31 enters the polarization conversion element 32. The polarization conversion element 32 has a polarization split film and a wave plate. The polarization conversion element 32 converts the illumination light WL including the fluorescence YL as unpolarized light into linearly polarized light which are made to enter the light modulation device 4R, the light modulation device 4G, and the light modulation device 4B.

The illumination light WL having been transmitted through the polarization conversion element 32 enters the superimposing lens 33a. The superimposing lens 33a homogenizes the illuminance distribution of the illumination light WL in the illumination target area in cooperation with the integrator optical system 31. The illumination device 2 generates the illumination light WL in such a manner as described above.

Hereinafter, the light path alteration section 24 will be described.

Figure 5:
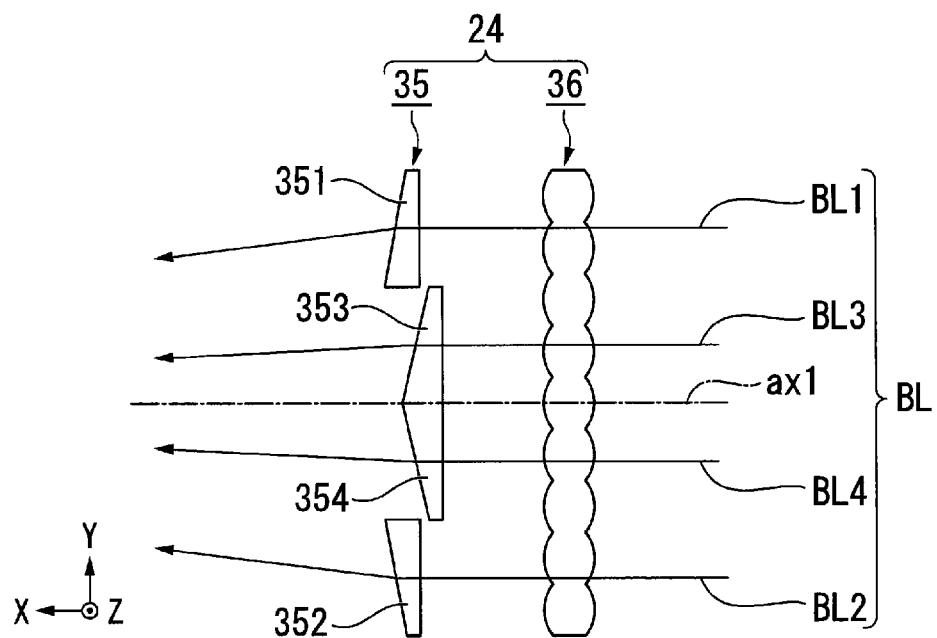
FIG. 5 is a schematic configuration diagram of a light path alteration section.

FIG. 5 is a schematic configuration diagram of the light path alteration section 24.

As shown in FIG. 5, the light path alteration section 24 is provided with a deviation prism array 35 and a multi-lens array 36 (a fifth optical element). The deviation prism array 35 has a first deviation prism 351 (a first optical element), a second deviation prism 352 (a second optical element), a third deviation prism 353, and a fourth deviation prism 354. The first deviation prism 351, the second deviation prism 352, the third deviation prism 353, and the fourth deviation prism 354 can be an integrated single member, or can also be individual members.

The first deviation prism 351 is disposed on the light path of the first pencil BL1 emitted from the first wave plate 28a. The second deviation prism 352 is disposed on the light path of the second pencil BL2 emitted from the first wave plate 28a. The third deviation prism 353 is disposed on the light path of the third pencil BL3 emitted from the first wave plate 28a. The fourth deviation prism 354 is disposed on the light path of the fourth pencil BL4 emitted from the first wave plate 28a.

The cross-sectional shape in the X-Y plane of each of the first deviation prism 351, the second deviation prism 352, the third deviation prism 353, and the fourth deviation prism 354 is a trapezoidal shape. The first deviation prism 351, the second deviation prism 352, the third deviation prism 353, and the fourth deviation prism 354 are each disposed so that the plane of incidence is perpendicular to the light axis ax1, and the exit surface is tilted with respect to the light axis ax1. The first deviation prism 351, the second deviation prism 352, the third deviation prism 353, and the fourth deviation prism 354 are each disposed in a direction in which a short side of the two sides parallel to each other of the trapezoid as the cross-sectional shape is far from the light axis ax1, and a long side thereof is close to the light axis ax1.

The pencils BL1, BL2, BL3, and BL4 pass through the deviation prism array 35 having the configuration described above to thereby bend each of the proceeding directions of the pencils BL1, BL2, BL3, and BL4 from a direction parallel to the light axis ax1 toward a direction coming closer to the light axis ax1. Specifically, the first pencil BL1 and the third pencil BL3 pass through the deviation prism array 35 to thereby bend the proceeding directions thereof downward in FIG. 5, namely toward the −Y-axis direction. The second pencil BL2 and the fourth pencil BL4 pass through the deviation prism array 35 to thereby bend the proceeding directions thereof upward in FIG. 5, namely toward the +Y-axis direction.

The multi-lens array 36 is disposed on the light path of the pencils BL between the light source section 21A and the deviation prism array 35. The multi-lens array 36 homogenizes the illuminance of the pencils BL on the wavelength conversion layer 42 to be irradiated with the pencils BL. In the case of the present embodiment, the multi-lens array 36 is formed of a both-surface multi-lens array having a plurality of lenses formed on each of the two surfaces of the base member. Thus, it is possible to shorten the physical light path length to achieve reduction in size of the light source device 2A compared to when being provided with two lens arrays. Further, the shape of each of the lenses viewed from the direction of the light axis ax1 is a square shape. Thus, the cross-sectional shape perpendicular to the light axis ax1 of the pencils BL emitted from the multi-lens array 36 becomes a square shape.

Here, there is assumed a light source device of a comparative example which is not provided with the light path alteration section 24 in the present embodiment.

Figure 7:
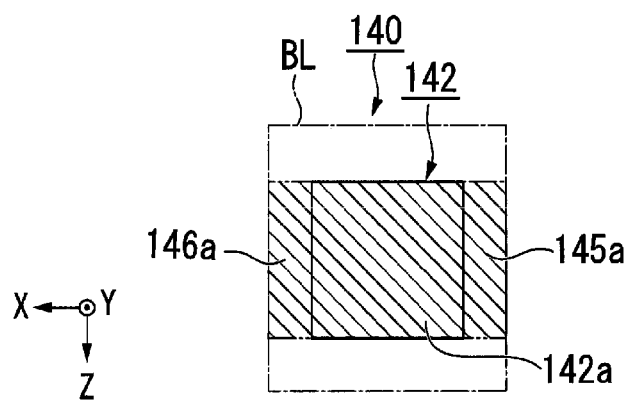
FIG. 7 is a diagram showing a light irradiation area on a wavelength conversion layer in a related art example.

FIG. 7 is a diagram showing a light irradiation area on the wavelength conversion element 140 in the comparative example.

As shown in FIG. 7, in the light source device in the comparative example, in order to make the pencils enter a wavelength conversion layer 142 also from a first side surface 142c and a second side surface 142d in addition to a plane of incidence 142a, an area including the plane of incidence 142a, a first reflecting surface 145a, and a second reflecting surface 146a in the plan view is irradiated with the pencils BL.

On this occasion, since the light source device in the comparative example is not provided with the light path alteration section, in order to irradiate the area described above with the pencils BL, it is necessary to enlarge the irradiation range of the pencils BL to an area which is hatched with oblique lines and includes the plane of incidence 142a, the first reflecting surface 145a, and the second reflecting surface 146a while keeping the cross-sectional shape perpendicular to the principal ray of the pencils BL in the square shape. In this case, the area where the first reflecting surface 145a and the second reflecting surface 146a do not exist, namely an area not hatched with the oblique lines out of the irradiation range of the pencils BL represented by the square shape with the dashed line, is irradiated with a part of the pencils BL, and the part of the pencils BL does not make a contribution to the wavelength conversion. In this case, the use efficiency of the excitation light decreases.

In contrast, since the light source device 2A according to the present embodiment is provided with the light path alternation section 24, the light path of each of the four pencils BL1, BL2, BL3, and BL4 emitted from the light source section 21A is bent by the deviation prism array 35 as described above. Assuming that the light path alteration section 24 does not exist, and all of the four pencils BL1, BL2, BL3, and BL4 enter the first light collection optical system 26 in a state of being parallel to the light axis ax2, the four pencils BL1, BL2, BL3, and BL4 are converged so that the principal rays of the respective pencils overlap the central point of the plane of incidence 42a of the wavelength conversion layer 42. Assuming that the light path alteration section 24 does not exist, and all of the four pencils BL1, BL2, BL3, and BL4 enter the first light collection optical system 26 in a state of being parallel to the light axis ax2, the four pencils BL1, BL2, BL3, and BL4 are converged so that the principal rays of the respective pencils overlap the central point of the plane of incidence 42a of the wavelength conversion layer 42. However, since actually four pencils BL1, BL2, BL3, and BL4 enter the first light collection optical system 26 in a state of not being parallel to the light axis ax2, all of the principal rays of the four pencils BL1, BL2, BL3, and BL4 do not overlap the central point of the plane of incidence 42a.

Figure 6:
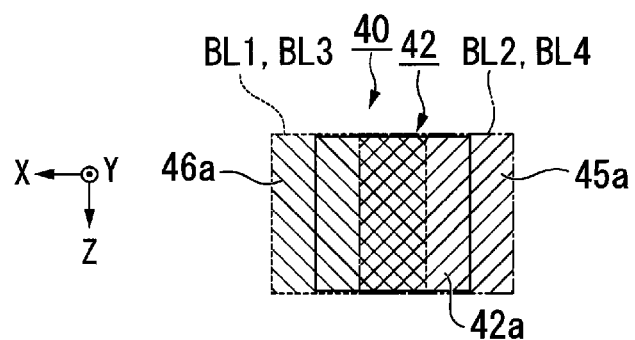
FIG. 6 is a diagram showing a light irradiation area on a wavelength conversion layer.

FIG. 6 is a diagram showing the light irradiation area on the wavelength conversion layer 42 in the wavelength conversion element 40 in the present embodiment.

As shown in FIG. 6, in the present embodiment, the principal ray of the first pencil BL1 and the principal ray of the third pencil BL3 enter a position shifted to the left from the central point of the plane of incidence 42a of the wavelength conversion layer 42. Further, the principal ray of the second pencil BL2 and the principal ray of the fourth pencil BL4 enter a position shifted to the right from the central point of the plane of incidence 42a of the wavelength conversion layer 42. In other words, the principal ray of the first pencil BL1 and the principal ray of the third pencil BL3 overlap each other on the plane of incidence 42a, and the principal ray of the second pencil BL2 and the principal ray of the fourth pencil BL4 overlap each other on the plane of incidence 42a, but the principal ray of the first pencil BL1 and the principal rays of the second pencil BL2 and the fourth pencil BL4 fail to overlap each other on the plane of incidence 42a, and the principal ray of the third pencil BL3 and the principal rays of the second pencil BL2 and the fourth pencil BL4 fail to overlap each other on the plane of incidence 42a.

Therefore, in the light source device 2A according to the present embodiment, the first pencil BL1 and the second pencil BL2 do not enter an area other than the plane of incidence 42a, the first reflecting surface 45a, and the second reflecting surface 46a, the first pencil BL1 is reflected by the first reflecting surface 45a, and then enters the wavelength conversion layer 42 from the first side surface 42c, and the second pencil BL2 is reflected by the second reflecting surface 46a, and then enters the wavelength conversion layer 42 from the second side surface 42d. Further, the third pencil BL3 and the fourth pencil BL4 do not enter an area other than the plane of incidence 42a, the first reflecting surface 45a, and the second reflecting surface 46a, the third pencil BL3 is reflected by the first reflecting surface 45a, and then enters the wavelength conversion layer 42 from the first side surface 42c, and the fourth pencil BL4 is reflected by the second reflecting surface 46a, and then enters the wavelength conversion layer 42 from the second side surface 42d.

As described above, in the light source device 2A according to the present embodiment, there is no chance that the area where the first reflecting surface 45a and the second reflecting surface 46a do not exist is irradiated with a part of the pencils BL, and thus, substantially the whole of the pencils BL makes a contribution to the wavelength conversion. As a result, according to the light source device 2A in the present embodiment, it is possible to prevent the use efficiency of the excitation light from decreasing. Further, in the wavelength conversion element 40 according to the present embodiment, the incident area of the excitation light increases compared to that of the wavelength conversion element in the related art in which the excitation light enters the wavelength conversion layer only from the plane of incidence, and therefore, the light density of the excitation light decreases. As a result, according to the light source device 2A in the present embodiment, it is possible to increase the wavelength conversion efficiency compared to the light source device in the related art.

Further, the projector 1 according to the present embodiment is provided with the light source device 2A described above, and is therefore capable of preventing the use efficiency of the excitation light from decreasing.

Second Embodiment

A second embodiment of the present disclosure will hereinafter be described using FIG. 8.

The basic configuration of a projector and a light source device according to the second embodiment is substantially the same as that in the first embodiment, and the configuration of the light path alteration section is different from that in the first embodiment. Therefore, the description of the whole of the projector and the light source device will be omitted.

Figure 8:
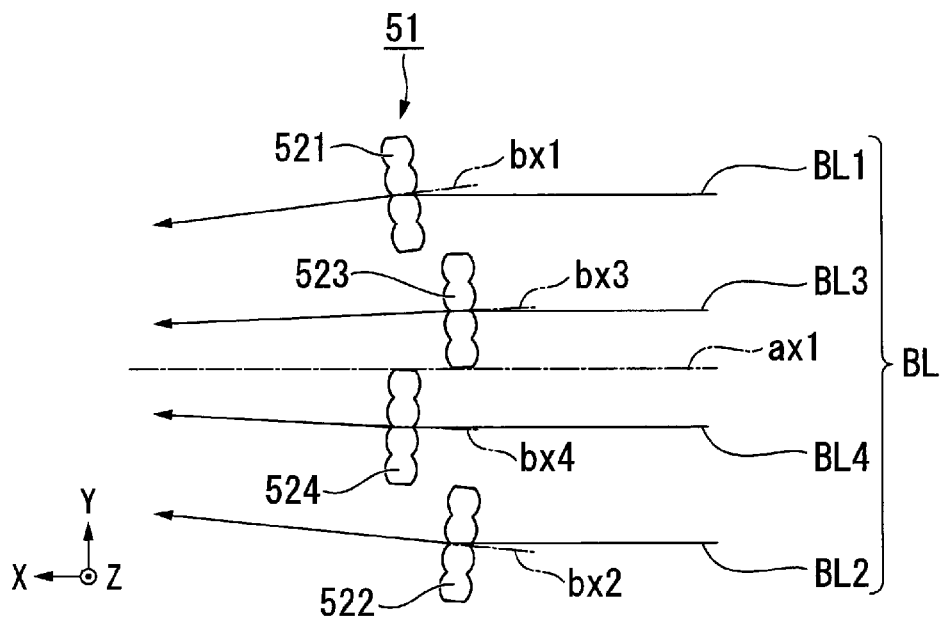
FIG. 8 is a schematic configuration diagram of a light path alteration section in a second embodiment.

FIG. 8 is a schematic configuration diagram of the light path alteration section in the second embodiment.

As shown in FIG. 8, the light path alteration section in the present embodiment is provided with a first multi-lens array 521 (a first optical element), a second multi-lens array 522 (a second optical element), a third multi-lens array 523, and a fourth multi-lens array 524. The first multi-lens array 521, the second multi-lens array 522, the third multi-lens array 523, and the fourth multi-lens array 524 can be an integrated single member, or can also be individual members.

The first multi-lens array 521 is disposed on the light path of the first pencil BL1 emitted from the first wave plate 28a. The second multi-lens array 522 is disposed on the light path of the second pencil BL2 emitted from the first wave plate 28a. The third multi-lens array 523 is disposed on the light path of the third pencil BL3 emitted from the first wave plate 28a. The fourth multi-lens array 524 is disposed on the light path of the fourth pencil BL4 emitted from the first wave plate 28a.

The first multi-lens array 521, the second multi-lens array 522, the third multi-lens array 523, and the fourth multi-lens array 524 are disposed so that optical axes bx1, bx2, bx3, and bx4 of the respective multi-lens arrays are tilted with respect to the light axis ax1. Specifically, the first multi-lens array 521, the second multi-lens array 522, the third multi-lens array 523, and the fourth multi-lens array 524 are tilted so as to come closer to the light axis ax1 as the pencils proceed. In other words, the optical axes bx1, bx2, bx3, and bx4 of the respective multi-lens arrays 521, 522, 523, and 534 are tilted with respect to the principal rays of the pencils BL1, BL2, BL3, and BL4 which have not entered the multi-lens arrays 521, 522, 523, and 524, respectively.

The optical axes of the multi-lens array each mean a line connecting the center of the curvature radius of the plane of incidence and the center of the curvature radius of the exit surface of each of the small lenses opposed to each other, and exist as much as the number of combinations of the small lenses, namely the number of combinations of the planes of incidence and the exit surfaces of the respective small lenses. In FIG. 8, the lines each of which passes through the center of the multi-lens array, and is parallel to the lines each connecting the center of the curvature radius of the plane of incidence and the center of the curvature radius of the exit surface of each of the small lenses are illustrated as the optical axes bx1, bx2, bx3, and bx4 of the multi-lens arrays.

The pencils BL1, BL2, BL3, and BL4 pass through the respective multi-lens arrays 521, 522, 523, and 524 having the configuration described above to thereby bend each of the proceeding directions of the pencils BL1, BL2, BL3, and BL4 from a direction parallel to the light axis ax1 toward a direction coming closer to the light axis ax1. Specifically, the first pencil BL1 and the third pencil BL3 pass through the multi-lens arrays 521, 523 to thereby bend the proceeding directions thereof downward in FIG. 8, namely toward the −Y-axis direction. The second pencil BL2 and the fourth pencil BL4 pass through the multi-lens arrays 522, 524 to thereby bend the proceeding directions thereof upward in FIG. 8, namely toward the +Y-axis direction.

In the light source device according to the present embodiment, the first pencil BL1 and the second pencil BL2 do not enter an area other than the plane of incidence 42a, the first reflecting surface 45a, and the second reflecting surface 46a, the first pencil BL1 is reflected by the first reflecting surface 45a, and then enters the wavelength conversion layer 42 from the first side surface 42c, and the second pencil BL2 is reflected by the second reflecting surface 46a, and then enters the wavelength conversion layer 42 from the second side surface 42d. Further, the third pencil BL3 and the fourth pencil BL4 do not enter an area other than the plane of incidence 42a, the first reflecting surface 45a, and the second reflecting surface 46a, the third pencil BL3 is reflected by the first reflecting surface 45a, and then enters the wavelength conversion layer 42 from the first side surface 42c, and the fourth pencil BL4 is reflected by the second reflecting surface 46a, and then enters the wavelength conversion layer 42 from the second side surface 42d.

Also in the light source device according to the present embodiment, it is possible to obtain substantially the same advantages as in the first embodiment such as the advantage that it is possible to prevent the use efficiency of the excitation light from decreasing and the advantage that it is possible to increase the wavelength conversion efficiency.

Third Embodiment

A third embodiment of the present disclosure will hereinafter be described using FIG. 9 and FIG. 10.

The basic configuration of a projector and a light source device according to the third embodiment is substantially the same as that in the first embodiment, and the configuration of the light path alteration section is different from that in the first embodiment. Therefore, the description of the whole of the projector and the light source device will be omitted.

Figure 9:
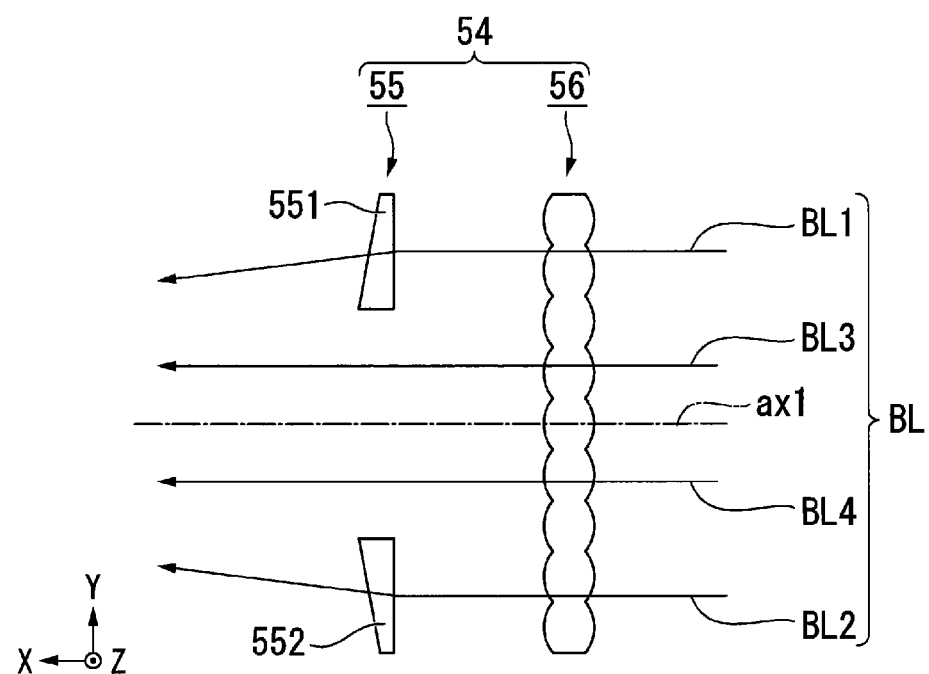
FIG. 9 is a schematic configuration diagram of a light path alteration section in a third embodiment.

FIG. 9 is a schematic configuration diagram of the light path alteration section in the third embodiment.

In FIG. 9, the constituents substantially the same as those in FIG. 5 used in the description of the first embodiment are denoted by the same reference symbols, and the detailed description thereof will be omitted.

As shown in FIG. 9, the light path alteration section 54 in the present embodiment is provided with a deviation prism array 55 and a multi-lens array 56 (a fifth optical element). The deviation prism array 55 has a first deviation prism 551 (a first optical element) and a second deviation prism 552 (a second optical element). The first deviation prism 551 and the second deviation prism 552 can be an integrated single member, or can also be individual members.

The first deviation prism 551 is disposed on the light path of the first pencil BL1 emitted from the first wave plate 28a. The second deviation prism 552 is disposed on the light path of the second pencil BL2 emitted from the first wave plate 28a. In the case of the present embodiment, there is disposed no deviation prism on the light paths of the third pencil BL3 and the fourth pencil BL4.

Similarly to the first embodiment, the cross-sectional shape in the X-Y plane of each of the first deviation prism 551 and the second deviation prism 552 is a trapezoidal shape. The first deviation prism 551 and the second deviation prism 552 are each disposed so that the plane of incidence is perpendicular to the light axis ax1, and the exit surface is tilted with respect to the light axis ax1. The first deviation prism 551 and the second deviation prism 552 are each disposed in a direction in which a short side of the two sides parallel to each other of the trapezoid as the cross-sectional shape is far from the light axis ax1, and a long side thereof is close to the light axis ax1.

The pencils BL1, BL2 pass through the deviation prism array 55 having the configuration described above to thereby bend each of the proceeding directions of the first pencil BL1 and the second pencil BL2 from a direction parallel to the light axis ax1 toward a direction coming closer to the light axis ax1. Specifically, the first pencil BL1 passes through the deviation prism array 55 to thereby bend the proceeding direction thereof downward in FIG. 9, namely toward the −Y-axis direction. The second pencil BL2 passes through the deviation prism array 55 to thereby bend the proceeding direction thereof upward in FIG. 9, namely toward the +Y-axis direction. In contrast, the proceeding directions of the third pencil BL3 and the fourth pencil BL4 are not bent.

Figure 10:
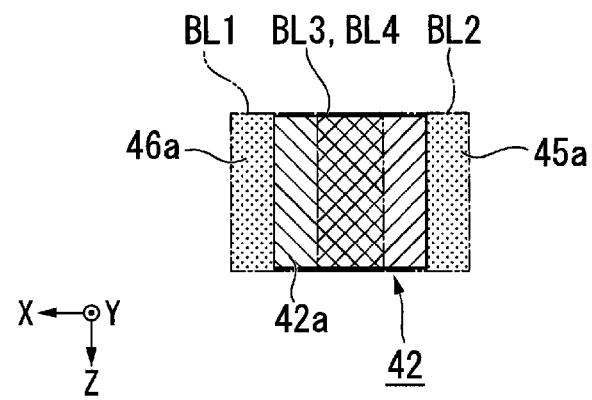
FIG. 10 is a diagram showing a light irradiation area on a wavelength conversion layer.

FIG. 10 is a diagram showing the light irradiation area on the wavelength conversion layer 42 in the wavelength conversion element in the present embodiment.

As shown in FIG. 10, in the light source device according to the present embodiment, the principal ray of the first pencil BL1 enters a position shifted to the left from the central point of the plane of incidence 42a of the wavelength conversion layer 42, and the principal ray of the second pencil BL2 enters a position shifted to the right from the central point of the plane of incidence 42a of the wavelength conversion layer 42. Therefore, the principal ray of the first pencil BL1 and the principal ray of the second pencil BL2 do not overlap each other on the plane of incidence 42a. Further, the principal ray of the third pencil BL3 and the principal ray of the fourth pencil BL4 do not overlap each other on the plane of incidence 42a.

Therefore, in the light source device according to the present embodiment, the first pencil BL1 and the second pencil BL2 do not enter an area other than the plane of incidence 42a, the first reflecting surface 45a, and the second reflecting surface 46a, the first pencil BL1 is reflected by the first reflecting surface 45a, and then enters the wavelength conversion layer 42 from the first side surface 42c, and the second pencil BL2 is reflected by the second reflecting surface 46a, and then enters the wavelength conversion layer 42 from the second side surface 42d. Further, the third pencil BL3 and the fourth pencil BL4 enter the wavelength conversion layer 42 from the plane of incidence 42a.

Also in the light source device according to the present embodiment, it is possible to obtain substantially the same advantages as in the first embodiment such as the advantage that it is possible to prevent the use efficiency of the excitation light from decreasing and the advantage that it is possible to increase the wavelength conversion efficiency.

Fourth Embodiment

A fourth embodiment of the present disclosure will hereinafter be described using FIG. 11.

The basic configuration of a projector and a light source device according to the fourth embodiment is substantially the same as that in the first embodiment, and the configuration of the light path alteration section is different from that in the first embodiment. Therefore, the description of the whole of the projector and the light source device will be omitted.

Figure 11:
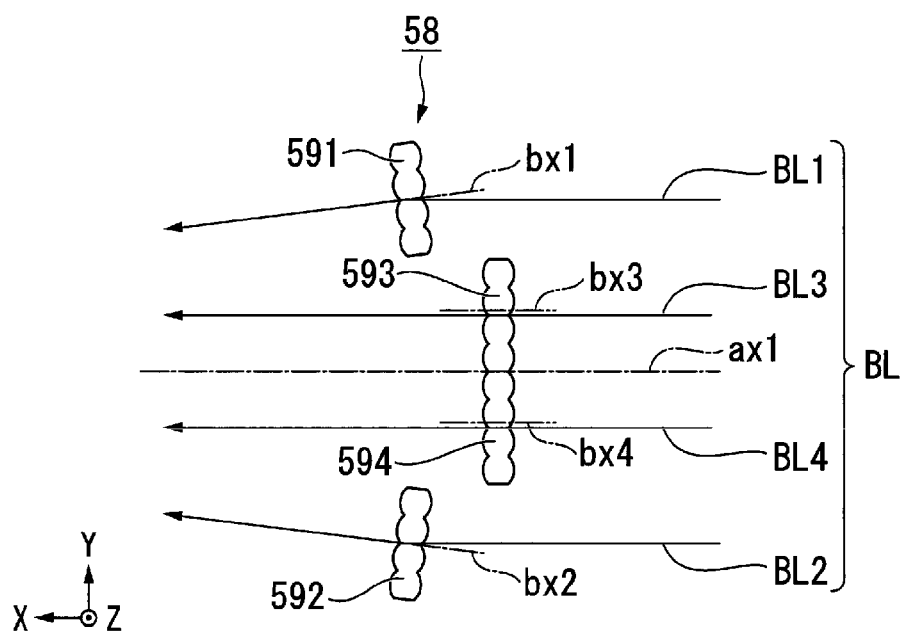
FIG. 11 is a schematic configuration diagram of a light path alteration section in a fourth embodiment.

FIG. 11 is a schematic configuration diagram of the light path alteration section in the fourth embodiment.

As shown in FIG. 11, the light path alteration section 58 in the present embodiment is provided with a first multi-lens array 591 (a first optical element), a second multi-lens array 592 (a second optical element), a third multi-lens array 593, and a fourth multi-lens array 594. The first multi-lens array 591, the second multi-lens array 592, the third multi-lens array 593, and the fourth multi-lens array 594 can be an integrated single member, or can also be individual members.

The first multi-lens array 591 is disposed on the light path of the first pencil BL1 emitted from the first wave plate 28a. The second multi-lens array 592 is disposed on the light path of the second pencil BL2 emitted from the first wave plate 28a. The third multi-lens array 593 is disposed on the light path of the third pencil BL3 emitted from the first wave plate 28a. The fourth multi-lens array 594 is disposed on the light path of the fourth pencil BL4 emitted from the first wave plate 28a.

The first multi-lens array 591 and the second multi-lens array 592 are disposed so that the optical axes bx1, bx2 of the respective multi-lens arrays 591, 592 are tilted with respect to the light axis ax1. Specifically, the first multi-lens array 591 and the second multi-lens array 592 are tilted so as to come closer to the light axis ax1 as the pencils proceed. Further, the third multi-lens array 593 and the fourth multi-lens array 594 are disposed so that the optical axes bx3, bx4 of the respective multi-lens arrays are parallel to the light axis ax1.

The pencils BL1, BL2 pass through the multi-lens arrays 591, 592 having the configuration described above to thereby bend each of the proceeding directions of the first pencil BL1 and the second pencil BL2 from a direction parallel to the light axis ax1 toward a direction coming closer to the light axis ax1. Specifically, the first pencil BL1 passes through the multi-lens array 591 to thereby bend the proceeding direction thereof downward in FIG. 11, namely toward the −Y-axis direction. The second pencil BL2 passes through the multi-lens array 592 to thereby bend the proceeding direction thereof upward in FIG. 11, namely toward the +Y-axis direction. In contrast, the proceeding directions of the third pencil BL3 and the fourth pencil BL4 are not bent.

Therefore, in the light source device according to the present embodiment, the first pencil BL1 and the second pencil BL2 do not enter an area other than the plane of incidence 42a, the first reflecting surface 45a, and the second reflecting surface 46a, the first pencil BL1 is reflected by the first reflecting surface 45a, and then enters the wavelength conversion layer 42 from the first side surface 42c, and the second pencil BL2 is reflected by the second reflecting surface 46a, and then enters the wavelength conversion layer 42 from the second side surface 42d. Further, the third pencil BL3 and the fourth pencil BL4 enter the wavelength conversion layer from the plane of incidence 42a.

Also in the light source device according to the present embodiment, it is possible to obtain substantially the same advantages as in the first embodiment such as the advantage that it is possible to prevent the use efficiency of the excitation light from decreasing and the advantage that it is possible to increase the wavelength conversion efficiency.

Fifth Embodiment

A fifth embodiment of the present disclosure will hereinafter be described using FIG. 12 through FIG. 16.

The basic configuration of a projector and a light source device according to the fifth embodiment is substantially the same as that in the first embodiment, and the configuration of the wavelength conversion element and the light path alteration section is different from that in the first embodiment. Therefore, the description of the whole of the projector and the light source device will be omitted.

Figure 12:
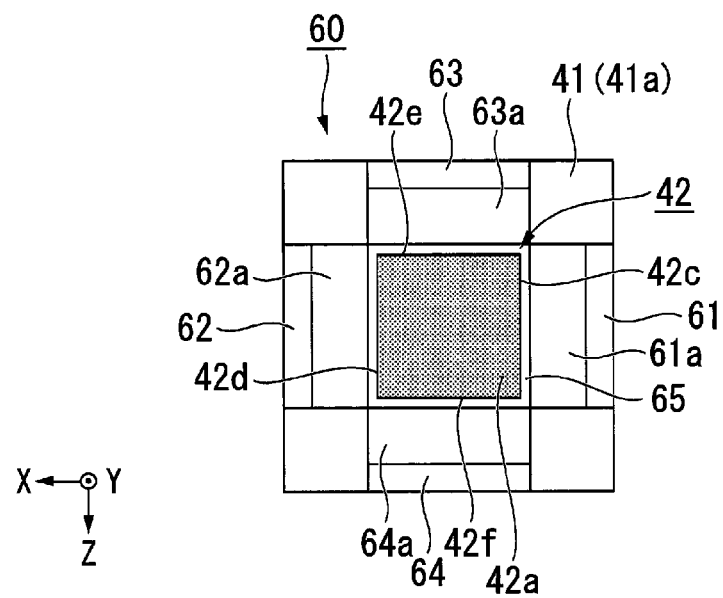
FIG. 12 is a plan view of a wavelength conversion element in a light source device according to a fifth embodiment.

FIG. 12 is a plan view of the wavelength conversion element in the fifth embodiment. In FIG. 12 through FIG. 16, the constituents common to the drawings used in the first embodiment are denoted by the same reference symbols, and the description thereof will be omitted.

As shown in FIG. 12, the wavelength conversion element 60 in the present embodiment is provided with a base member 41, a wavelength conversion layer 42, a first reflecting element 61, a second reflecting element 62, a third reflecting element 63, a fourth reflecting element 64, a dichroic mirror 65, and a heatsink (not shown).

The first reflecting element 61, the second reflecting element 62, the third reflecting element 63, and the fourth reflecting element 64 are disposed on the first surface 41a of the base member 41. The first reflecting element 61 and the second reflecting element 62 are substantially the same as the first reflecting element 45 and the second reflecting element 46 of the wavelength conversion element 40 in the first embodiment.

The third reflecting element 63 has a third reflecting surface 63a, and is disposed so that the third reflecting surface 63a is opposed to the third side surface 42e of the wavelength conversion layer 42. The third reflecting surface 63a is tilted so as to form an angle of 45° with respect to the first surface 41a of the base member 41. The fourth reflecting element 64 has a fourth reflecting surface 64a, and is disposed so that the fourth reflecting surface 64a is opposed to the fourth side surface 42f of the wavelength conversion layer 42. The fourth reflecting surface 64a is tilted so as to form an angle of 45° with respect to the first surface 41a of the base member 41. The third reflecting element 63 and the fourth reflecting element 64 are each formed of a metal material high in optical reflectance such as aluminum or silver. The height of the third reflecting element 63 and the fourth reflecting element 64 is equal to the thickness of the wavelength conversion layer 42.

In the case of the present embodiment, since the wavelength conversion element 60 has the third reflecting element 63, apart of the pencils BL having been emitted toward the third reflecting element 63 is reflected by the third reflecting surface 63a, and then enters the wavelength conversion layer 42 from the third side surface 42e. Further, since the wavelength conversion element 60 has the fourth reflecting element 64, a part of the pencils BL having been emitted toward the fourth reflecting element 64 is reflected by the fourth reflecting surface 64a, and then enters the wavelength conversion layer 42 from the fourth side surface 42f. As described above, the pencils BL with which the wavelength conversion element 60 is irradiated enters the wavelength conversion layer 42 not only from the plane of incidence 42a but also from the first side surface 42c, the second side surface 42d, the third side surface 42e, and the fourth side surface 42f.

Figure 13:
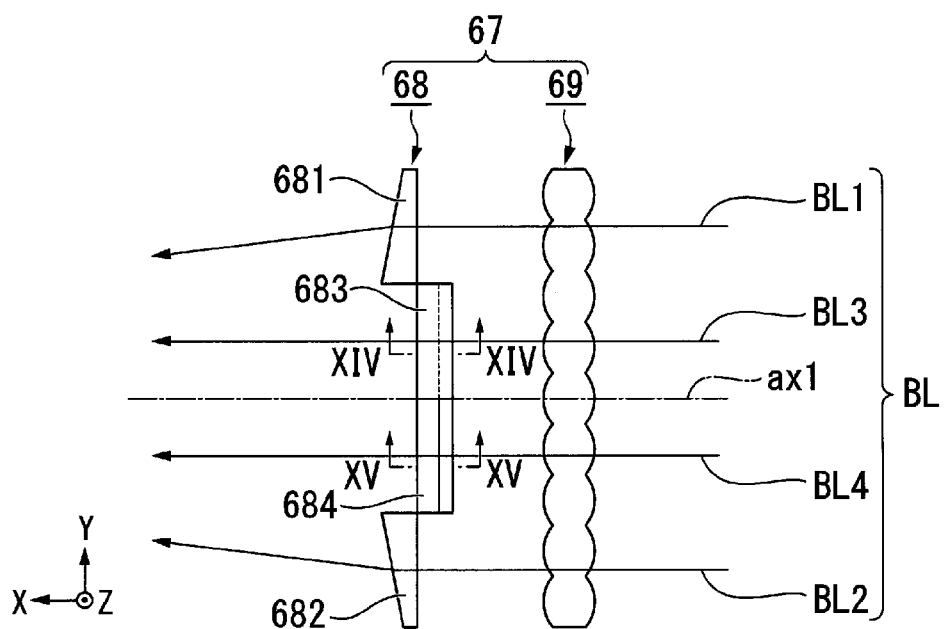
FIG. 13 is a schematic configuration diagram of a light path alteration section.
Figure 14:
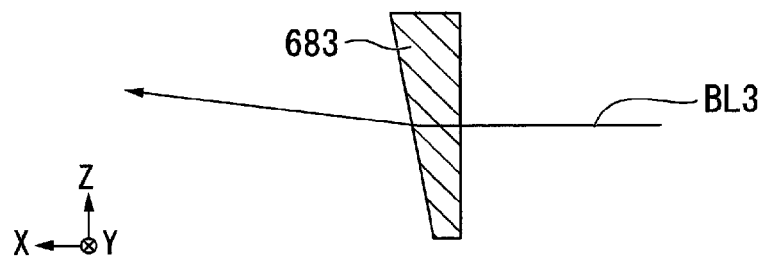
FIG. 14 is a cross-sectional view along the line XIV-XIV shown in FIG. 13.
Figure 15:
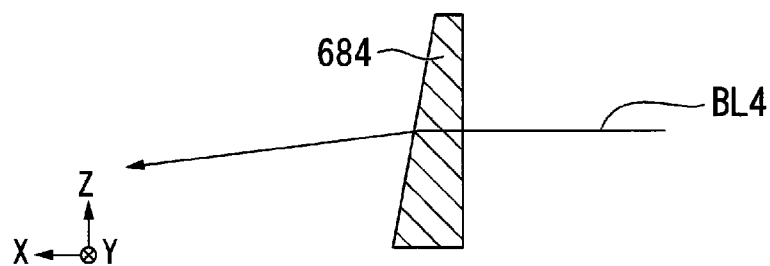
FIG. 15 is a cross-sectional view along the line XV-XV shown in FIG. 13.

FIG. 13 is a schematic configuration diagram of the light path alteration section 67 in the present embodiment. FIG. 14 is a cross-sectional view of a third deviation prism 683 along the line XIV-XIV shown in FIG. 13. FIG. 15 is a cross-sectional view of a fourth deviation prism 684 along the line XV-XV shown in FIG. 13.

As shown in FIG. 13, the light path alteration section 67 in the present embodiment is provided with a deviation prism array 68 and a multi-lens array 69 (a fifth optical element). The deviation prism array 68 has a first deviation prism 681 (a first optical element), a second deviation prism 682 (a second optical element), a third deviation prism 683 (a third optical element), and a fourth deviation prism 684 (a fourth optical element). The first deviation prism 681, the second deviation prism 682, the third deviation prism 683, and the fourth deviation prism 684 can be an integrated single member, or can also be individual members.

The cross-sectional shape in the X-Y plane of each of the first deviation prism 681 and the second deviation prism 682 is a trapezoidal shape. Further, the cross-sectional shape in the X-Y plane of each of the third deviation prism 683 and the fourth deviation prism 684 is a trapezoidal shape. The first deviation prism 681, the second deviation prism 682, the third deviation prism 683, and the fourth deviation prism 684 are each disposed so that the plane of incidence is perpendicular to the light axis ax1, and the exit surface is tilted with respect to the light axis ax1. The first deviation prism 681 and the second deviation prism 682 are each disposed in a direction in which a short side of the two sides parallel to each other of the trapezoid as the cross-sectional shape is far from the light axis ax1, and a long side thereof is close to the light axis ax1, when viewed from a normal direction of the X-Y plane.

As shown in FIG. 14, the third deviation prism 683 is disposed in a direction in which the short side of the two sides parallel to each other of the trapezoid as the cross-sectional shape is located on the −Z-axis direction side, namely on the lower side in FIG. 14, and the long side thereof is located on the +Z-axis direction side, namely on the upper side in FIG. 14, when viewed from the normal direction of the X-Z plane.

As shown in FIG. 15, the fourth deviation prism 684 is disposed in a direction in which the short side of the two sides parallel to each other of the trapezoid as the cross-sectional shape is located on the +Z-axis direction side, namely on the upper side in FIG. 15, and the long side thereof is located on the −Z-axis direction side, namely on the lower side in FIG. 15, when viewed from the normal direction of the X-Z plane.

The pencils BL1, BL2, BL3, and BL4 pass through the deviation prism array 68 having the configuration described above to thereby bend the proceeding directions of the pencils BL1, BL2, BL3, and BL4 toward four respective directions different from each other when viewed from the proceeding directions of the pencils. Specifically, the first pencil BL1 passes through the deviation prism array 68 to thereby bend the proceeding direction thereof toward the −Y-axis direction, namely downward in FIG. 13. The second pencil BL2 passes through the deviation prism array 68 to thereby bend the proceeding direction thereof toward the +Y-axis direction, namely upward in FIG. 13. The third pencil BL3 passes through the deviation prism array 68 to thereby bend the proceeding direction thereof toward the +Z-axis direction, namely frontward direction of the sheet in FIG. 13. The fourth pencil BL4 passes through the deviation prism array 68 to thereby bend the proceeding direction thereof toward the −Z-axis direction, namely backward direction of the sheet in FIG. 13.

Figure 16:
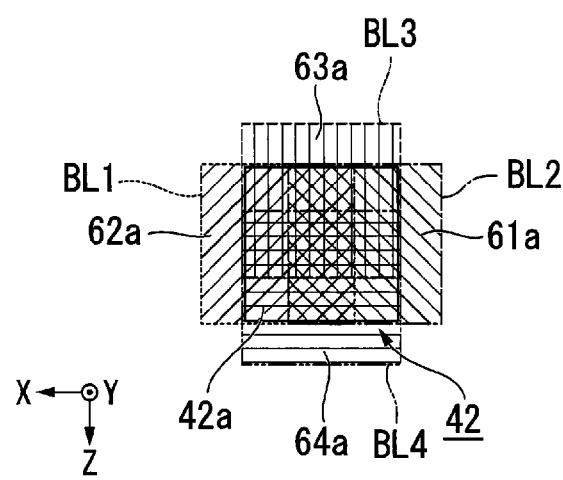
FIG. 16 is a diagram showing a light irradiation area on a wavelength conversion layer.

FIG. 16 is a diagram showing the light irradiation area on the wavelength conversion layer 42 in the wavelength conversion element 60 in the present embodiment.

As shown in FIG. 16, in the light source device according to the present embodiment, the principal ray of the first pencil BL1 is shifted to the left from the central point of the plane of incidence 42a of the wavelength conversion layer 42, the principal ray of the second pencil BL2 is shifted to the right from the central point of the plane of incidence 42a of the wavelength conversion layer 42, the principal ray of the third pencil BL3 is shifted to the upper side from the central point of the plane of incidence 42a of the wavelength conversion layer 42, and the principal ray of the fourth pencil BL4 is shifted to the lower side from the central point of the plane of incidence 42a of the wavelength conversion layer 42. In other words, the principal ray of the first pencil BL1, the principal ray of the second pencil BL2, the principal ray of the third pencil BL3, and the principal ray of the fourth pencil BL4 do not overlap each other on the plane of incidence 42a.

Therefore, in the light source device according to the present embodiment, the first pencil BL1 and the second pencil BL2 do not enter an area other than the plane of incidence 42a, the first reflecting surface 61a, and the second reflecting surface 62a, the first pencil BL1 is reflected by the first reflecting surface 61a, and then enters the wavelength conversion layer 42 from the first side surface 42c, and the second pencil BL2 is reflected by the second reflecting surface 62a, and then enters the wavelength conversion layer 42 from the second side surface 42d. Further, the third pencil BL3 and the fourth pencil BL4 do not enter an area other than the plane of incidence 42a, the third reflecting surface 63a, and the fourth reflecting surface 64a, the third pencil BL3 is reflected by the third reflecting surface 63a, and then enters the wavelength conversion layer 42 from the third side surface 42e, and the fourth pencil BL4 is reflected by the fourth reflecting surface 64a, and then enters the wavelength conversion layer 42 from the fourth side surface 42f.

As described above, in the case of the light source device 2A according to the present embodiment, there is no chance that the area where the first reflecting surface 61a, the second reflecting surface 62a, the third reflecting surface 63a, and the fourth reflecting surface 64a do not exist is irradiated with a part of the pencils BL, and thus, substantially the whole of the pencils BL makes a contribution to the wavelength conversion. As a result, according to the light source device 2A in the present embodiment, it is possible to prevent the use efficiency of the excitation light from decreasing. Further, in the wavelength conversion element 60 according to the present embodiment, the incident area of the excitation light increases compared to that of the wavelength conversion element in the related art in which the excitation light enters the wavelength conversion layer only from the plane of incidence, and therefore, the light density of the excitation light decreases. As a result, according to the light source device 2A in the present embodiment, it is possible to increase the wavelength conversion efficiency compared to the light source device in the related art.

Further, the projector according to the present embodiment is provided with the light source device described above, and is therefore capable of preventing the use efficiency of the excitation light from decreasing.

Sixth Embodiment

A sixth embodiment of the present disclosure will hereinafter be described using FIG. 17 through FIG. 19.

The basic configuration of a projector and a light source device according to the sixth embodiment is substantially the same as that in the first embodiment, and the configuration of the light path alteration section is different from that in the first embodiment. Therefore, the description of the whole of the projector and the light source device will be omitted.

Figure 17:
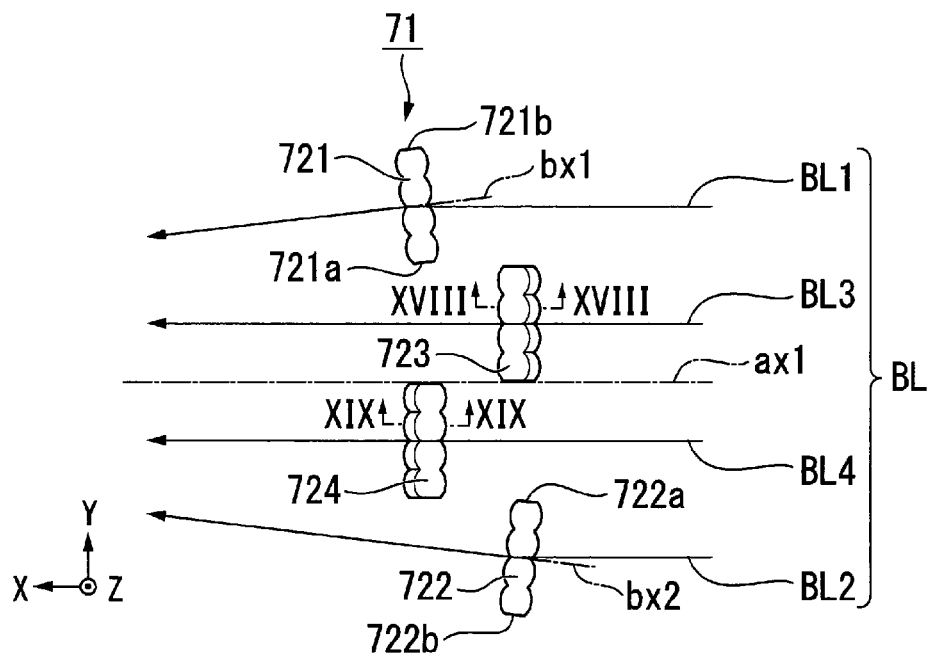
FIG. 17 is a schematic configuration diagram of a light path alteration section in a sixth embodiment.

FIG. 17 is a schematic configuration diagram of the light path alteration section 71 in the sixth embodiment. FIG. 18 is a cross-sectional view of a third multi-lens array along the line XVIII-XVIII shown in FIG. 17. FIG. 19 is a cross-sectional view of a fourth multi-lens array along the line XIX-XIX shown in FIG. 17.

As shown in FIG. 17, the light path alteration section 71 in the present embodiment is provided with a first multi-lens array 721 (a first optical element), a second multi-lens array 722 (a second optical element), the third multi-lens array 723 (a third optical element), and the fourth multi-lens array 724 (a fourth optical element). The first multi-lens array 721, the second multi-lens array 722, the third multi-lens array 723, and the fourth multi-lens array 724 can be an integrated single member, or can also be individual members.

The first multi-lens array 721 is disposed on the light path of the first pencil BL1 emitted from the first wave plate 28a. The second multi-lens array 722 is disposed on the light path of the second pencil BL2 emitted from the first wave plate 28a. The third multi-lens array 723 is disposed on the light path of the third pencil BL3 emitted from the first wave plate 28a. The fourth multi-lens array 724 is disposed on the light path of the fourth pencil BL4 emitted from the first wave plate 28a.

The first multi-lens array 721, the second multi-lens array 722, the third multi-lens array 723, and the fourth multi-lens array 724 are disposed so that optical axes bx1, bx2, bx3, and bx4 of the respective multi-lens arrays are tilted with respect to the light axis ax1.

Specifically, the first multi-lens array 721 and the second multi-lens array 722 are tilted in a direction in which end parts 721*a*, 722*a* on the side near to the light axis ax1 are close to the first wave plate 28*a*, and end parts 721*b*, 722*b* on the side far from the light axis ax1 are far from the first wave plate 28*a*.

Figure 18:
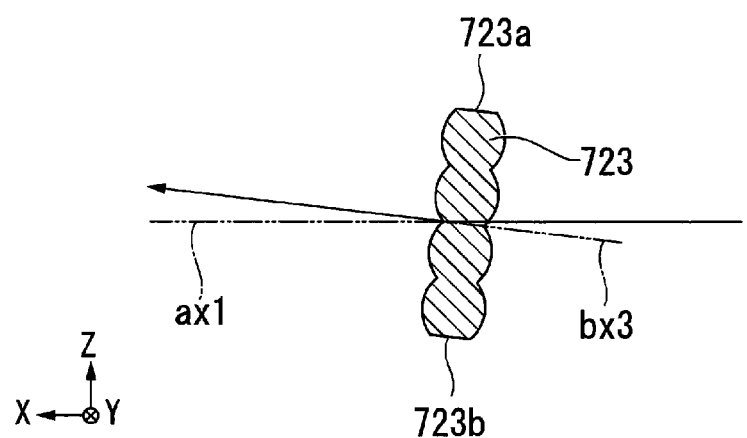
FIG. 18 is a cross-sectional view along the line XVIII-XVIII shown in FIG. 17.
Figure 19:
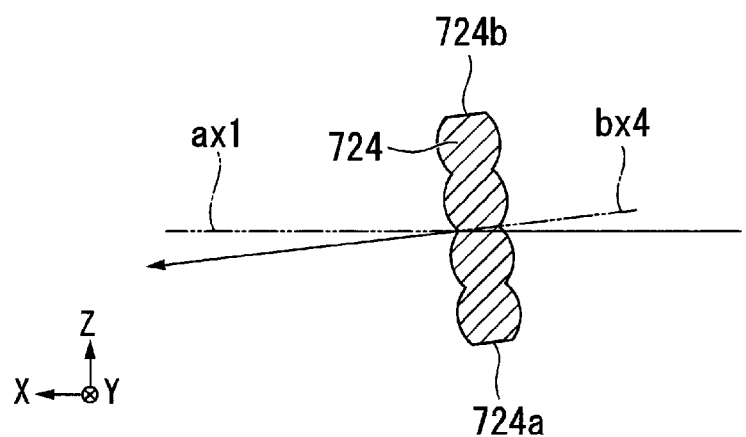
FIG. 19 is a cross-sectional view along the line XIX-XIX shown in FIG. 17.

As shown in FIG. 18, the third multi-lens array 723 is tilted in a direction in which the end part 723*a* in the +Z-axis direction, namely the upper end in FIG. 18, is close to the first wave plate 28*a*, and the end part 723*b* in the −Z-axis direction, namely the lower end in FIG. 18, is far from the first wave plate 28*a*. As shown in FIG. 19, the fourth multi-lens array 724 is tilted in a direction in which the end part 724*a* in the −Z-axis direction, namely the lower end in FIG. 19, is close to the first wave plate 28*a*, and the end part 724*b* in the +Z-axis direction, namely the upper end in FIG. 19, is far from the first wave plate 28*a*.

Thus, the first pencil BL1 passes through the first multi-lens array 721 to thereby bend the proceeding direction thereof toward the −Y-axis direction, namely downward in FIG. 17. The second pencil BL3 passes through the second multi-lens array 722 to thereby bend the proceeding direction thereof toward the +Y-axis direction, namely upward in FIG. 17. The third pencil BL3 passes through the third multi-lens array 723 to thereby bend the proceeding direction thereof toward the +Z-axis direction, namely frontward direction of the sheet in FIG. 17. The fourth pencil BL4 passes through the fourth multi-lens array 724 to thereby bend the proceeding direction thereof toward the −Z-axis direction, namely backward direction of the sheet in FIG. 17.

Therefore, also in the light source device according to the present embodiment, similarly to the fifth embodiment, the first pencil BL1 and the second pencil BL2 do not enter an area other than the plane of incidence 42*a*, the first reflecting surface 61*a*, and the second reflecting surface 62*a*, the first pencil BL1 is reflected by the first reflecting surface 61*a*, and then enters the wavelength conversion layer 42 from the first side surface 42*c*, and the second pencil BL2 is reflected by the second reflecting surface 62*a*, and then enters the wavelength conversion layer 42 from the second side surface 42*d*. Further, the third pencil BL3 and the fourth pencil BL4 do not enter an area other than the plane of incidence 42*a*, the third reflecting surface 63*a*, and the fourth reflecting surface 64*a*, the third pencil BL3 is reflected by the third reflecting surface 63*a*, and then enters the wavelength conversion layer 42 from the third side surface 42*e*, and the fourth pencil BL4 is reflected by the fourth reflecting surface 64*a*, and then enters the wavelength conversion layer 42 from the fourth side surface 42*f*.

Also in the light source device according to the present embodiment, it is possible to obtain substantially the same advantages as in the first embodiment such as the advantage that it is possible to prevent the use efficiency of the excitation light from decreasing and the advantage that it is possible to increase the wavelength conversion efficiency.

It should be noted that the scope of the present disclosure is not limited to the embodiments described above, but a variety of modifications can be provided thereto within the scope or the spirit of the present disclosure.

For example, the example in which the light source section emits the four pencils is shown in the present embodiment described above, but it is sufficient for the light source section to have a configuration of emitting at least two pencils including the first pencil and the second pencil.

In the second embodiment, the fourth embodiment, and the sixth embodiment described above, it is possible to replace the both-side multi-lens array with a plurality of multi-lens arrays including the first multi-lens array and the second multi-lens array providing the proceeding directions of the principal rays of the respective pencils can be changed. It should be noted that when using the plurality of multi-lens arrays, it is sufficient for the plurality of multi-lens arrays to be able to integrally function to alter the proceeding directions of the principal rays.

Besides the above, the specific descriptions of the shape, the number, the arrangement, the material, and so on of the constituents of the light source device and the projector are not limited to those of the embodiments described above, but can arbitrarily be modified. Although in each of the embodiments, there is described the example of installing the light source device according to the present disclosure in the projector using the liquid crystal light valves, the example is not a limitation. The light source device according to the present disclosure can also be installed in the projector using digital micromirror devices as the light modulation devices.

Although in each of the embodiments, there is described the example of installing the light source device according to the present disclosure in the projector, the example is not a limitation. The light source device according to the present disclosure can also be applied to lighting equipment, a headlight of a vehicle, and so on.

What is claimed is:

1. A light source device comprising:
   a light source section configured to emit a first pencil and a second pencil which have a first wavelength band;
   a first optical element configured to alter a proceeding direction of a principal ray of the first pencil;
   a second optical element configured to alter a proceeding direction of a principal ray of the second pencil;
   a wavelength conversion layer having a plane of incidence which the first pencil and the second pencil enter, a reflecting surface different from the plane of incidence, a first side surface crossing the plane of incidence and the reflecting surface, and a second side surface which crosses the plane of incidence and the reflecting surface and is different from the first side surface, and configured to perform wavelength conversion of the first pencil and the second pencil into fluorescence having a second wavelength band different from the first wavelength band;
   a first reflecting element having a first reflecting surface and disposed so as to be opposed to the first side surface; and
   a second reflecting element having a second reflecting surface and disposed so as to be opposed to the second side surface, wherein
   the first optical element and the second optical element alter the proceeding directions of the principal ray of the first pencil and the principal ray of the second pencil so that the principal ray of the first pencil and the principal ray of the second pencil do not overlap each other on the plane of incidence,
   when viewed from an incident direction of the first pencil and the second pencil with respect to the wavelength conversion layer, a shape of the plane of incidence is a rectangular shape, and the first pencil and the second pencil do not enter an area other than the plane of incidence, the first reflecting surface, and the second reflecting surface, the first pencil is reflected by the first reflecting element to enter the wavelength conversion layer from the first side surface, and the second pencil is reflected by the second reflecting element to enter the wavelength conversion layer from the second side surface.

2. The light source device according to claim 1, further comprising:

a third optical element;

a fourth optical element;

a third reflecting element having a third reflecting surface; and a fourth reflecting element having a fourth reflecting surface, wherein the light source section further emits a third pencil and a fourth pencil which have the first wavelength band, the third optical element alters a proceeding direction of a principal ray of the third pencil, the fourth optical element alters a proceeding direction of a principal ray of the fourth pencil, the wavelength conversion layer further has a third side surface crossing the plane of incidence, the reflecting surface, and the first side surface, and a fourth side surface which crosses the plane of incidence, the reflecting surface, and the first side surface, and is different from the third side surface, the third reflecting element is disposed so as to be opposed to the third side surface, the fourth reflecting element is disposed so as to be opposed to the fourth side surface, the third optical element alters the proceeding direction of the principal ray of the third pencil so that the principal ray of the third pencil fails to do not overlap the principal ray of the first pencil, the principal ray of the second pencil, and the principal ray of the fourth pencil on the plane of incidence, the fourth optical element alters the proceeding direction of the principal ray of the fourth pencil so that the principal ray of the fourth pencil fails to do not overlap the principal ray of the first pencil, the principal ray of the second pencil, and the principal ray of the third pencil on the plane of incidence, the first pencil, the second pencil, the third pencil, and the fourth pencil do not enter an area other than the plane of incidence, the first reflecting surface, the second reflecting surface, the third reflecting surface, and the fourth reflecting surface when viewed from the incident direction, the third pencil is reflected by the third reflecting element to enter the wavelength conversion layer from the third side surface, and the fourth pencil is reflected by the fourth reflecting element to enter the wavelength conversion layer from the fourth side surface.

3. The light source device according to claim 2, wherein the first optical element and the second optical element are deviation prisms.

4. The light source device according to claim 3, further comprising:

a fifth optical element which is disposed on light paths of the first pencil and the second pencil between the light source section and the deviation prisms, and homogenizes illuminance of the first pencil and the second pencil.

5. The light source device according to claim 2, wherein the first optical element and the second optical element are multi-lens arrays, and an optical axis of the multi-lens array is tilted with respect to one of the principal ray of the first pencil and the principal ray of the second pencil which is going to enter the multi-lens array.

6. The light source device according to claim 1, wherein the first optical element and the second optical element are deviation prisms.

7. The light source device according to claim 6, further comprising:

a fifth optical element which is disposed on light paths of the first pencil and the second pencil between the light source section and the deviation prisms, and homogenizes illuminance of the first pencil and the second pencil.

8. The light source device according to claim 1, wherein the first optical element and the second optical element are multi-lens arrays, and an optical axis of the multi-lens array is tilted with respect to one of the principal ray of the first pencil and the principal ray of the second pencil which is going to enter the multi-lens array.

9. A projector comprising:

the light source device according to claim 1;

a light modulation device configured to modulate light emitted from the light source device in accordance with image information; and a projection optical device configured to project the light modulated by the light modulation device.

* * * * *